United States Patent Office 2,712,908
Patented July 12, 1955

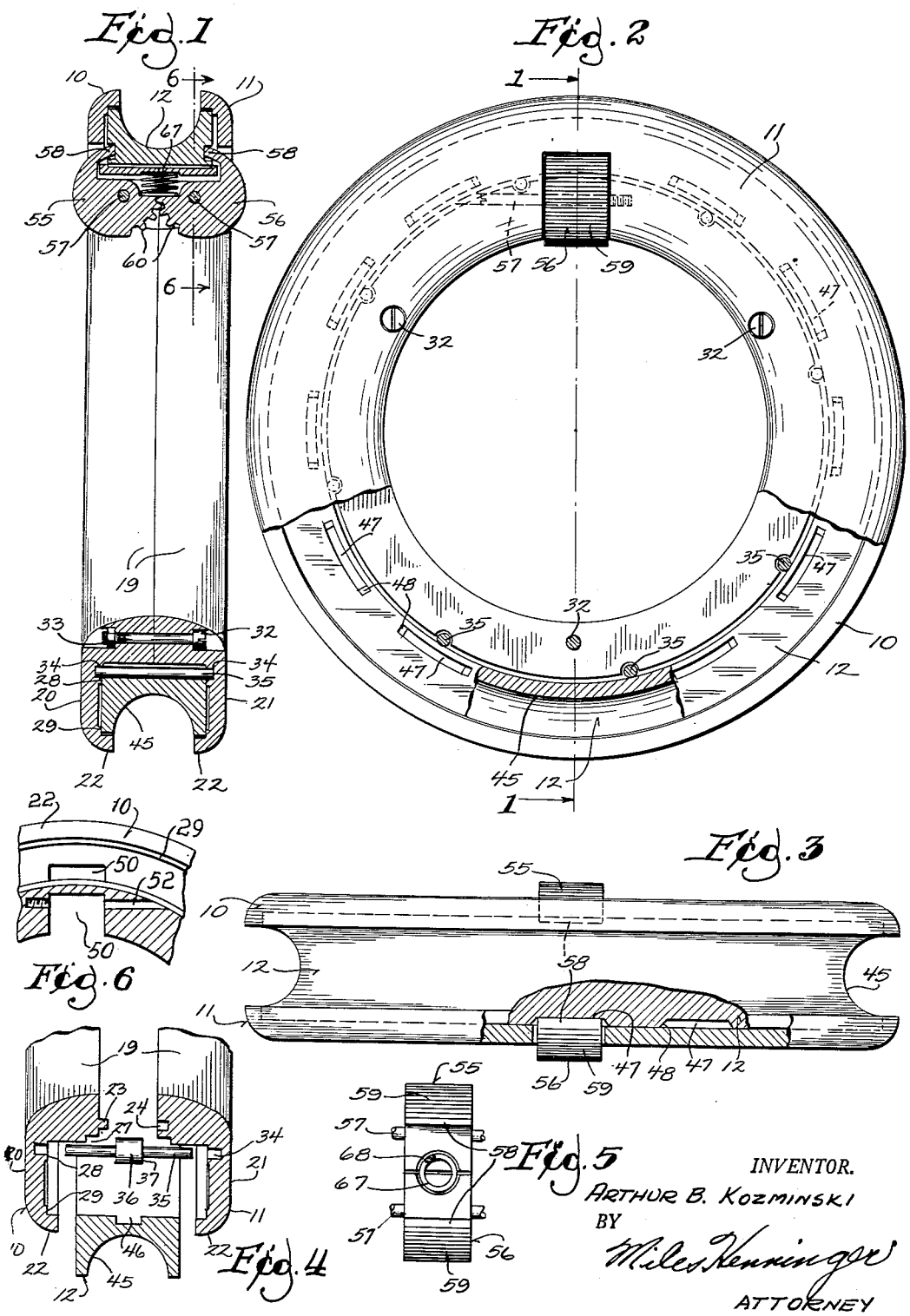

2,712,908

HAND-LINE FISHING REEL

Arthur B. Kozminski, Milwaukee, Wis.

Application January 23, 1953, Serial No. 332,869

8 Claims. (Cl. 242—99)

This invention relates to improvements in reels for hand-line fishing, i. e., fishing with a line held in the hand rather than extending along or from a pole.

The reels heretofore used for hand-line fishing are subject to a number of disadvantages which have severely limited the use of hand-lines and made their use hazardous. Usually, the prior hand-line reels were not adapted for casting the line directly from the reel but required that the line be drawn from the reel in loops to be held in one hand and cast from that hand while the other hand held the reel. Such reels are useful only for retaining the uncast portion of the fishing line, and are impractical for casting the hand-line either overhand or underhand as may be best adapted to the particular conditions or to the particular fisherman.

Some of the prior hand-line reels were provided with brakes for retarding the rate at which a fish could take line off a reel. In some instances, the location of the brake-actuating part was such that the reel could be used only either from the right or left hand, or that the brake could be operated only by the hand not then holding the reel. Where the brakes were operable only from one side of the reel or by the fisherman's free hand, the reel had to be shifted from hand to hand, thus losing some control of the fish.

It is therefore an object of the present invention to provide a hand-line fishing reel for casting the line, handling or "playing" the fish and for retaining the line and which is operable from either hand and in the manner in which the several fishing operations are most convenient for the particular user.

Another object of the invention is to provide a reel for hand-line fishing in which a brake is provided to be operable from either side of the reel and hence operable when the reel is held in either hand, and by the hand holding the reel or by the fisherman's free hand.

Another object of the invention is to provide a reel for hand-line fishing in which the hand holding the reel is adequate to operate a brake either for retarding rotation of the reel or for locking the reel in a hand-grip piece, and thus leave the other hand free for manipulation of the line otherwise than merely by restraining or stopping a pull tending to take the line off the reel.

Another object of the invention is to provide a reel for hand-line fishing in which the reel is so shaped that it may be entirely encircled by the fingers of a hand without danger of cutting of the hand by line rapidly drawn off the reel or by other actions requiring the shifting of the position of the reel in the hand or from hand to hand.

Objects and advantages other than those above set forth will be apparent from the following description when read in connection with the accompanying drawing in which:

Fig. 1 is a cross-section of the present reel, taken on the line 1—1 of Fig. 2.

Fig. 2 is a side elevation of the reel with portions thereof broken away.

Fig. 3 is an edge elevation of the present reel with portions broken away.

Fig. 4 is an exploded sectional view of the reel for particularly showing the shapes of various portions thereof and a modification of one part.

Fig. 5 is a top plan view of the brake sub-assembly of the reel; and

Fig. 6 is a fragmentary sectional view on the line 6—6 of Fig. 1.

Generally, the reel comprises a housing formed from two identical parts with meshing partial tongues and grooves for positioning the parts in the proper relation. The assembled housing (as a whole) has a ring-like or generally flattened, toroidal shape. The inner periphery, the flattened side surfaces and the outer peripheral surface portions of the housing are rounded and smooth and some of such surfaces coact with the line-receiving portion of the reel for smooth delivery from and reception on the reel of the fishing line. When joined, the housing halves define a groove with circular and substantially plane surfaces equidistant from a plane through the joint between the housing halves (a diametric plane) and one edge of each of the housing halves extends partially over the groove.

Roller bearings are mounted in and extend across the housing groove to coact in defining a bearing of generally circular form on which is rotatably mounted a spool having an outer peripheral groove for receiving the fishing line. The housing and spool edges defining the peripheral groove, are brought closely together to avoid spaces in which the fishing line might be caught when the reel is in use. Portions of the spool side surfaces are circular planes coacting with the similar housing surfaces in centering and guiding the spool in its rotation in the housing groove. Central enlargements of the bearings may be provided to act in a runway formed jointly by the housing and spool for performing the centering and guiding functions or to aid therein.

A pair of brake disks are rotatably mounted in a pair of recesses transversely of the housing and from the inner periphery and side surfaces thereof. The brake disks interengage to rotate simultaneously upon exertion of pressure on either disk to bring friction fingers on the disk into and out of contact with two sides of the spool. The brake disks are under the action of a spring urging the friction fingers toward their respective spool sides for retarding rotation of the spool in the housing or for locking the spool in the housing.

Referring to the drawings by numerals in which the same numerals designate the same parts, numerals 10 and 11 generally designate two parts forming a housing and a spool generally designated 12. Referring particularly to Fig. 4, it will be seen that the housing parts 10, 11 are identical ring-like members which coact in forming a rounded inner peripheral surface 19 so that the assembled reel can be gripped and shifted in one hand to various positions. Indentations may be formed in such surface for seating the fingers and thus more securely holding the reel when wet or slippery. The side surfaces 20 and 21 of the housing are also rounded as are the flange-like edge portions 22 of the outer housing peripheral surfaces.

When the housing parts are joined, such parts define a groove from the outer peripheral edge and the parts are held against relative displacement by tongues 23 seating in grooves 24 in the surfaces brought together to form the joint. It will be understood the tongues 23 and grooves 24 extend only partially around the housing to permit the two parts to be made in the same mold. Rabbets 27 may be formed from the bottom of the housing groove to coact in forming a portion of a runway which is centered on the plane through the housing joint.

The side surfaces of the housing groove are formed with a number of circular and plane surfaces 28, 29 which are equidistant from the diametric plane through the assembled housing. The flange 22 of each housing half has an inner surface at least substantially defining a circle and at substantially a right angle to the guiding surfaces 28, 29 of the groove.

Each of the housing halves is formed with a number of registrable holes having countersunk portions at the outer ends thereof when the housing is assembled, for receiving bolts and the bolt heads 32 and nuts 33 below the rounded exterior surfaces of the housing 10, 11.

The housing is provided with pairs of opposite sockets 34 from the groove side surface, of a size to receive rollers 35 in easy sliding relationship so that the rollers may serve as bearings for the spool. The rollers are preferably cylindrical but may be formed with a portion 36 of the larger diameter for a short distance from centrally of the length of each roller as indicated in Fig. 4. The end surfaces 37 of the roller enlargements 36 are then plane surfaces perpendicular to the center lines of the rollers whereby the enlargements may engage in the runway in the co-acting housing and spool for aiding in supporting and centering the spool in the housing.

The spool 12 is also ring-like, i. e., generally annular in form and is formed with an arcuate outer peripheral surface 45 in which the fish line is wound. The inner peripheral spool surface is generally smooth and defines a cylindrical wall of a size seating on the assembled bearings 35. If the bearings have the enlargements 36, a second groove 46 is formed in the spool from the inner periphery thereof to coact with the bearing runway groove in the housing in receiving the bearing enlargements for aiding in supporting the spool and in guiding the spool in its rotation in the housing. The runway groove surfaces are made to have an easy sliding and rolling clearance from the roller bearing surfaces.

The side surfaces of the spool 12 are formed with the smooth portions of circular and plane shape to coact with the housing surfaces 28, 29 in guiding rotary movement of the spool. The spool side surfaces are also made with notches 47 spaced at intervals around each side surface of the spool in a circle and preferably more nearly adjacent the inner periphery than the outer periphery of the spool. The notches 47 are formed with sloping surfaces 48 at the ends of the notches for smooth entry into and exit from the notches of the frictional members of a brake to be described.

Each housing half 10, 11 is formed with a substantially rectangular recess 50 thereinto from the inner peripheral and side surfaces thereof and extending transversely of the housing halves. Each of such recesses 50 has an aperture therefrom into the housing groove. Holes 52 are formed at a right angle to the center line of the recesses 50 and severally have internal screw threads adjacent one end of the holes. The recesses 50 are severally adapted to receive generally cylindrical or disk-like members 55, 56 rotatably mounted on screws 57 forming axles for such members and engageable in the threads in the holes 52.

Each of the brake disks 55, 56 has a finger 58 extending through the aperture in its housing recess 50 and the fingers are capable of extension into any one of the series of notches 47 on the adjacent side of the spool for frictionally engaging the bottom surfaces of the notches. Each of the disks has a peripheral portion knurled or milled as indicated at 59 and has a peripheral portion toothed as indicated at 60. The several sets of teeth are shaped as gear teeth capable of meshing upon rotation of the members. The members 55, 56 and the axles 57 are so dimensioned and placed that the meshing teeth will rotate the members for entering and retracting the fingers 58 into and out of the notches 47.

In addition to interengagement of the brake members 55, 56 by meshing of the teeth 60, such members are also substantially connected by a helical compression spring 67 seated at one end in an indentation in the co-acting housing parts 10, 11 and a socket 68 formed by co-action of the brake disks. The brake disks rotate only for a limited portion of a circle and the socket 68 accordingly aids the housing seat in retaining the spring in its proper relationship with other parts.

So long as no pressure is put on the brake members, the spool will rotate freely when the line is pulled out, the ends of the brake fingers 58 sliding into and out of the notches 47 on the sloping surfaces 48 thereof. If even easier rotation of the spool within the housing is desired (as when casting the line), a pressure on a brake member laterally toward the center of the reel will rotate such members and further compress the spring 67 to bring the ends of the friction fingers 58 away from the spool side surfaces.

When a fish is hooked and it is desired to retard the rate at which the line may be taken off the spool, pressure exerted on a brake disk 55, 56 toward the outer periphery of the reel will press the ends of the brake fingers 58 on the side of the spool and into the notches thereof. It has been found that the pressure exertable by the thumb or one finger of either hand will exert more than enough braking action on the reel to play the hooked fish as desired.

The present reel is adapted for both fresh and salt-water fishing. Hence, it is desirable that the housing halves, the spool and the brake members be molded of one of the known plastic materials unaffected by either fresh or salt-water. The housing bolts, the bearings, the brake axles and the spring are preferably made of a metal resistant to corrosion such as alloy steels or the bronzes usually used in maritime equipment.

Although but one embodiment of the present invention has been illustrated and described, it will be apparent to those skilled in the art that various changes and modifications may be made therein without departing from the spirit of the invention or from the scope of the appended claims.

I claim:

1. In a reel for hand-line fishing, a ring-like housing having a groove in the outer periphery thereof, a plurality of roller bearings rotatably mounted in and extending between the sides of the housing groove, a substantially annular spool mounted on the bearings and rotatably retained in the housing groove, the spool having a groove about the outer periphery thereof for receiving the fishing line, and inter-engaged braking members rotatably mounted in the housing for frictional engagement with the spool and severally protruding from the housing sides for exertion of pressure thereon and braking action by both of the members on the spool and upon rotation of either of the members.

2. In a reel for hand-line fishing, a ring-like housing having a groove in the outer periphery thereof, the housing having recesses in the side surfaces and inner periphery thereof and apertures from the recesses into the groove, the housing having sockets in aligned pairs in opposite walls of the groove, a plurality of roller bearings rotatably mounted in the sockets and extending between the sides of the housing groove for defining a circle of spaced bearings about the housing groove, a substantially annular spool mounted on the bearings and rotatably retained in the housing groove, the spool having a groove about the outer periphery thereof for receiving the fishing line, a pair of inter-engaged brake members severally and rotatably mounted in and protruding from the housing recesses and extending through the apertures therefrom for frictional engagement with the spool, exertion of pressure on either brake member causing braking action by both of the members on the spool.

3. In a reel for hand-line fishing, a ring-like housing having therein a groove partially enclosed by outer peripheral flanges and having recesses in the inner periphery and side surfaces thereof and apertures in the recesses into the groove, the sides of the groove having substantially parallel circular and plane surfaces, a plurality of roller bearings rotatably mounted in and extending between the sides of the housing grooves for defining a circular bearing, a substantially annular spool mounted on the bearings and rotatably retained in the housing groove, the spool having a groove about the outer periphery thereof for receiving the fishing line, the spool having peripheral surfaces matching flange surfaces of the housing and having substantially parallel and plane side surfaces opposite the plane housing groove side surfaces, a pair of inter-engaged brake members severally and rotatably mounted in and protruding outwardly from the housing recesses and extended through the apertures for frictional engagement with the sides of the spool, exertion of pressure on either brake member causing braking action by both of the members on the spool.

4. In a reel for hand-line fishing, a ring-like housing having a groove in the outer periphery thereof and recesses in the side surfaces and inner periphery thereof and apertures from the recesses into the groove, the housing groove having sockets in aligned pairs in the side walls and adjacent the bottom thereof, a plurality of roller bearings rotatably mounted in the housing sockets and extending between the sides of the housing groove, a substantially annular spool mounted on the bearings and rotatably retained in the housing groove, the spool having a groove about the outer periphery thereof for receiving the fishing line, a pair of inter-engaged disk-like brake members rotatably mounted in and protruding outwardly from the housing recesses and severally having a finger for extending through the apertures from the recesses and severally frictionally engageable with a side of the spool, exertion of pressure on either of the members causing braking action by both of the members on the spool.

5. In a reel for hand-line fishing, a ring-like housing having a groove in the outer periphery thereof and recesses in the side surfaces and inner periphery thereof a plurality of roller bearings rotatably mounted in and extending between the sides of the housing groove, a substantially annular spool mounted on the bearings and rotatably retained in the housing groove, the spool having a groove about the outer periphery thereof for receiving the fishing line, the spool having pairs of notches in the opposite side surfaces thereof and uniformly spaced to define circles on such surfaces, a plurality of brake means severally and rotatably mounted in and protruding outwardly from the housing recesses and severally extending through the housing into the groove therein for frictional engagement with the spool sides and the notches therein and having meshing teeth for braking action by all the brake means on the spool upon rotation of either of the means.

6. In a reel for hand-line fishing, a ring-like housing having a first groove in the outer periphery thereof and having a second groove in the bottom of the first groove, a plurality of roller bearings rotatably mounted in and extending between the sides of the housing first groove, the bearings severally having a cylindric enlargement about the midpoint of the roller lengths, a substantially annular spool mounted on the bearings and rotatably retained in the housing groove, the spool having a first groove about the outer periphery thereof for receiving the fishing line and having a second groove from the inner periphery thereof co-acting with the housing second groove in receiving the bearing enlargements, and braking means operable from the inner periphery and both side surfaces of the housing for braking rotation of the spool relative to the housing, the means causing braking action on both sides of the spool upon operation of the braking means.

7. In a reel for hand-line fishing, a pair of identical housing halves joinable to form a ring-like housing, means for joining the housing halves, the housing having a first groove in the outer periphery thereof, the adjoining surfaces of the housing halves having matched partial tongues and grooves for positioning and holding the housing halves against movement in a plane diametric of the housing, the adjoining housing surfaces severally having a rabbet and the rabbets co-acting to define a second housing groove, both housing grooves having center lines on the diametric plane of the housing, a plurality of roller bearings rotatably mounted in and extending between the sides of the housing groove for defining a circular bearing, the rollers severally having cylindric enlargements rolling in the second housing groove, a substantially annular spool mounted on the bearings and rotatably retained in the housing groove, the spool having a first groove about the outer periphery thereof for receiving the fishing line, the spool having a second groove from the inner periphery thereof for co-action with the second housing groove in receiving the rollers for guiding movement of the spool in the housing first groove, a pair of inter-engaged brake members severally and rotatably mounted in and extending outwardly from the housing recesses and extending therefrom for frictional engagement with the sides of the spool for braking action by both of the members on the spool and upon rotation of either of the members.

8. In a reel for hand-line fishing, a ring-like housing having a groove in the outer periphery thereof and recesses in the side surfaces and inner periphery thereof and having an aperture from the several recesses into the groove, a plurality of roller bearings rotatably mounted in and extending between the sides of the housing grooves, a substantially annular spool mounted on the bearings and rotatably retained in the housing groove, the spool having a groove about the outer periphery thereof for receiving the fishing line and having sets of notches severally in the sides thereof in spaced circular arrangement for severally registering with the housing apertures, a pair of disk-like brake members severally and rotatably mounted in the housing recesses and severally having a finger extending through the housing apertures for frictional engagement with the sides of the spool and the notches in the spool, the brake members protruding outwardly from the housing recesses for exertion of pressure upon either of the members and severally having teeth in portions of the surfaces thereof for meshing into inter-engagement of the members, and a spring acting between the housing and the pair of brake disks for urging the brake fingers into end-wise frictional engagement with the sides of and the notches in the spool.

References Cited in the file of this patent

UNITED STATES PATENTS

| | | |
|---|---|---|
| 999,641 | Fuerst | Aug. 1, 1911 |
| 1,800,851 | Wennerstrom | Apr. 14, 1931 |
| 1,815,433 | Dunagan | July 21, 1931 |
| 1,956,806 | Mitzen et al. | May 1, 1934 |
| 2,249,433 | Palmer | July 15, 1941 |
| 2,312,262 | Murdock et al. | Feb. 23, 1943 |
| 2,541,183 | Abele | Feb. 13, 1951 |
| 2,603,429 | Jaworowski et al. | July 15, 1952 |
| 2,689,709 | Waldschmidt | Sept. 21, 1954 |

FOREIGN PATENTS

| | | |
|---|---|---|
| 18,373 | Great Britain | Dec. 17, 1888 |